Oct. 20, 1953  G. L. HELLER  2,656,254
CARBON BLACK
Filed Dec. 11, 1948
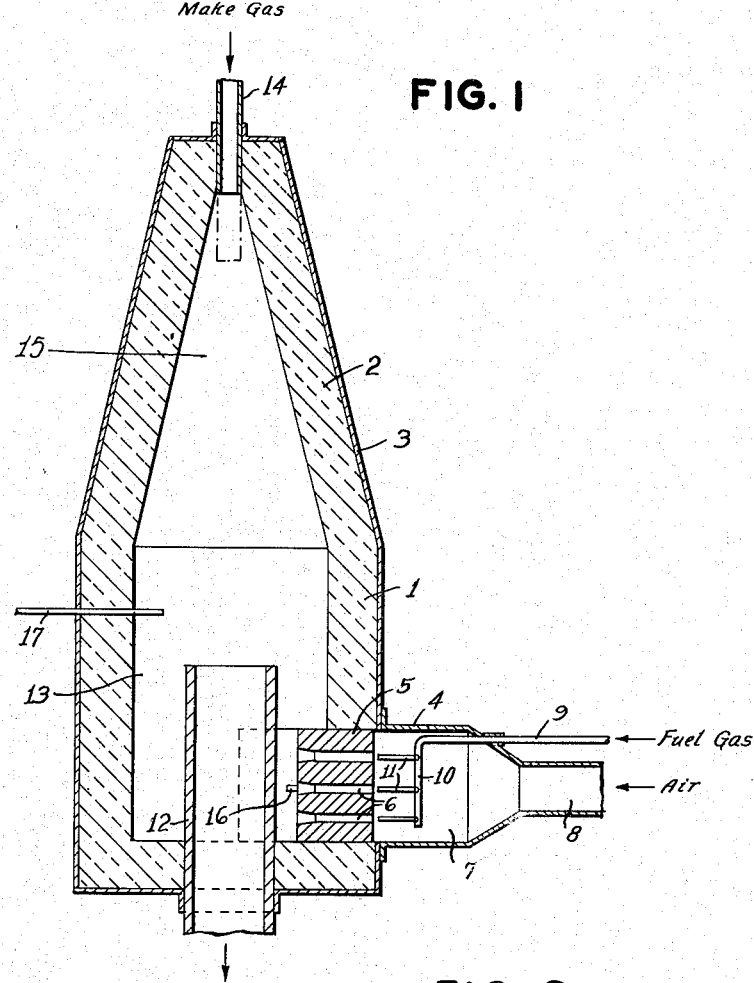
FIG. 1
FIG. 2
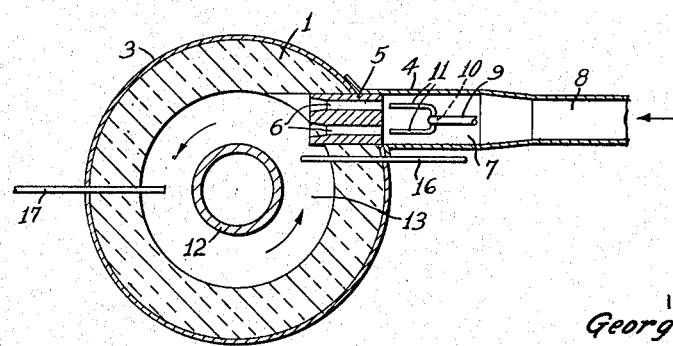

Patented Oct. 20, 1953

2,656,254

UNITED STATES PATENT OFFICE 2,656,254

CARBON BLACK

George L. Heller, Monroe, La., assignor to Columbian Carbon Company, New York, N. Y., a corporation of Delaware Application December 11, 1948, Serial No. 64,764

1 Claim. (Cl. 23—209.4)

This invention relates to the production of carbon black and provides a novel, highly advantageous process of the general type in which the carbon black is produced by decomposition of a hydrocarbon in a furnace chamber by heat absorbed from hot combustion gases. The invention also provides a novel furnace especially adapted to the carrying out of the process.

In operations of this general type, various methods have been proposed for bringing the hydrocarbon to be decomposed into contact with the hot combustion gases and for effecting a more or less rapid, uniform mixing of the two. It has been found that the properties and yields of the resultant carbon black are materially influenced by the method of effecting this heat exchange and mixing.

One particularly desirable method heretofore proposed involves the blasting of a combustible mixture of hydrocarbon gas and air into one end of an elongated chamber, burning the mixture therein to form a highly turbulent blast flame and separately injecting a hydrocarbon gas into the blast flame whereby the separately injected hydrocarbons are rapidly mixed with the blast flame gases before coming into contact with the confining walls of the chamber.

According to another previously proposed process, a stream of air is passed into one end of an elongated chamber, coaxially with the chamber, and hydrocarbon gas is introduced through the ducts surrounding the air inlet and caused to flow along the walls of the chamber around the air stream gradually becoming mixed with the air and partially consumed thereby, generating heat for effecting the decomposition of the remainder of the hydrocarbon gas. Such process is subject to the recognized disadvantage of contact between concentrated hydrocarbons and the highly heated furnace walls.

By a still further process, it has been proposed to avoid this difficulty by injecting the hydrocarbon gas into one end of an elongated chamber, coaxially with the chamber, and tangentially injecting into the same end of the chamber an amount of air sufficient only to effect partial combustion of the hydrocarbon gas, the air spiraling through the chamber along the wall thereof about a central core of the concentrated hydrocarbon gas flowing through the furnace chamber, the air gradually becoming mixed with the gas and effecting partial combustion thereof, thus generating heat whereby the remainder of the hydrocarbon gas is decomposed to form carbon black.

A difficulty experienced in operations of this type, generally, has been the control of side reactions which materially reduce the yield of carbon black, primarily side reactions resulting in the formation of carbon monoxide.

It is recognized that, in the decomposition of hydrocarbons to form carbon black, considerable hydrogen is liberated and it has further been recognized as highly desirable to effect a chemical union of the liberated hydrogen with oxygen so as to minimize carbon monoxide formation. However, practical means for repressing the formation of carbon monoxide by side reactions have not heretofore been available.

It is further desirable in the production of certain types of furnace carbons by the decomposition of hydrocarbons to effect a partial pyrolysis of the hydrocarbons prior to substantial dilution by mixing with the furnace gases. However, it has been found detrimental to permit the hydrocarbons, in concentrated form during such pyrolysis, to come into contact with the highly heated walls of the furnace.

A further undesirable characteristic of many processes of the general type described is a too rapid drop in furnace gas temperature, as the gases proceed through the elongated furnace chamber, due to heat absorbed by the endothermic decomposition of the hydrocarbons, which drop in temperature has been found materially to influence certain characteristics of the resultant product. The furnace temperature gradient also appears to influence side reactions.

My present invention provides an improved process whereby many of the difficulties heretofore experienced in operations of the general type may be avoided, or materially reduced.

In accordance with my process, I blast a combustible gaseous mixture tangentially into the enlarged cylindrical end of a furnace chamber of a general shape approximating that of a conventional cyclone separator and in substantially the manner in which gaseous suspensions are normally injected into cyclone separators having tangential inlets. This chamber is composed of a cylindrical body portion closed at one end and extended at the other end as a coaxially positioned cone-shaped zone and provided with a coaxially positioned outlet tube extending coaxially through the end wall of the cylindrical end of the furnace. It is sometimes desirable that the outlet tube project into the furnace chamber to a point substantially beyond the combustible gas inlet, but this is not always necessary.

Upon entering the chamber the combustible mixture is ignited to form a blast flame, and resultant hot flame gases are spiraled along the outer walls of the chamber to approximately the extreme end of the cone-shaped portion of the chamber and, from thence, returned as an inner spiral and passed from the furnace chamber through the outlet previously mentioned.

The hydrocarbon to be decomposed is separately injected into the furnace, either as a gaseous stream, or as an atomized liquid. In one advantageous method of operation, the hydrocarbon, for instance, natural gas, vaporized oil, or a mixture of both, or atomized liquid hydrocarbons, herein and in the appended claims referred to as "make gas," is introduced at the extreme conical end coaxially with the furnace chamber. When the make gas is introduced in this way, it becomes distributed on the inner wall of the rising spiral of gas as a whirling thin sheet leaving the central axis open and forming a thin cone of concentrated hydrocarbons separated from the furnace wall by the flame gases. Liquids thus introduced in atomized form are quickly flashed to vapor and similarly formed into a whirling thin sheet. In this way, the make gas encounters at first only a small portion of the blast products and, upon increased travel, is subjected to larger quantities of the blast products and progressively higher temperatures. With this method of introducing the make gas, there is a retardation of uniform mixing so that a completely uniform mixing may not be effected before the gases or vapors are discharged from the furnace.

By an alternative procedure, the make gas is introduced in a tangential direction, spaced from the cylindrical furnace walls, at the end of the furnace chamber to which the blast flame is introduced and tangential to the inner face of the whirling blanket of blast flame gases. By this procedure, the make gas is protected from the walls of the furnace by the blast flame gases and is sandwiched between the blanket of blast flame gases and the induced secondary spiral of descending gases. In this way, the make gas rapidly becomes mixed with the rising spiral of blast flame gases.

By a further alternative operating procedure, liquid hydrocarbons are sprayed in a radial direction into the furnace chamber at a point intermediate the zone of blast flame injection and the other end of the cylindrical zone of the furnace chamber. By this procedure, it is advantageous that the make gas be injected into the furnace atmosphere at approximately the boundary between the outer ascending spiral of combustion gases and the inner descending gas spiral.

The optimum make gas injection procedure is dependent primarily upon the type of raw material used, i. e., whether a gas or vapor or an atomized liquid, and also will depend to a considerable extent upon the desired fineness of subdivision and other qualities of the product. The procedure first described is better adapted to operations where a less finely divided carbon is desired and the two alternative procedures are better adapted to operations where finer particle size is desired. Further, the first make gas injection procedure is better adapted to use where the make gas is injected as a gas or vapor and the two alternative procedures are better adapted to the injection of the make gas as an atomized liquid.

The invention will be further described and illustrated with reference to the accompanying drawings, which represent conventionally and somewhat diagrammatically, apparatus embodying my present invention and in which the process may, with advantage, be carried out and of which:

Figure 1 represents a longitudinal sectional view, including the blast burner, and Figure 2 represents a transverse sectional view taken through the lower cylindrical portion of the chamber.

The furnace comprises a lower cylindrical body portion 1 surmounted by a cone-shaped portion 2, the walls of which are composed of a refractory heat resistant material, such as conventionally used in the construction of high temperature furnaces. Advantageously, the walls of the furnace are also covered with a heat insulating material and the entire furnace encased in a metal sheeting, such as indicated at 3. Instead of metal, any conventional impervious material may be used.

Blast burner 4 is tangentially positioned in the furnace wall at the lower end of the cylindrical body portion, as more clearly shown in Figure 2 of the drawing. The blast burner shown is of the multi-port type comprising a refractory burner block 5 having ports 6 extending therethrough, the outer ends of the ports opening into wind box 7 to which air is supplied under pressure through duct 8. Fuel gas is supplied, also under pressure, through pipe 9 to manifold 10, suspended in the wind box by suitable means and from which nipples 11 extend horizontally, coaxially positioned with respect to the respective burner ports. Blast burners of the general type represented in the drawing, are particularly desirable for the purpose, but it will be understood that other types of blast burners may be employed.

Cylindrical outlet conduit 12 extends upwardly through the floor of the furnace to a point in the cylindrical chamber 13 substantially above the blast burner ports and coaxially positioned with respect to the cylindrical chamber.

A make gas injection tube 14, coaxially positioned with respect to the chamber, extends through the upper wall of the furnace into the conical chamber 15 and is so constructed and arranged as to permit the adjustment of the tube with respect to the distance it extends into the furnace chamber.

In operation, combustion air is supplied through conduit 8 to wind box 7 and is forced through the burner ports 6. Fuel gas supplied through pipe 9 and manifold 10 is jetted from the nipples 11 into the entrance of the burner ports 6 where it is intimately mixed with the combustion air and the mixture blasted tangentially into the chamber 13. As the blast gases enter chamber 13, they are ignited forming high velocity blast flames which spiral upwardly through chamber 13 and the conical chamber 15 along the outer walls of the chamber. On reaching the upper end of chamber 15, the flame gases pass as an inner spiral downwardly through the chamber and from the chamber through outlet 12, after the fashion of a cyclone separator.

According to the first described operating procedure, the make gas is separately and forcefully injected into the upper end of the chamber through make gas injection tube 14, comes into contact with the blast flame gases and is decomposed by heat absorbed from the gases to form carbon particles in suspension, the products of decomposition being carried downwardly through the chamber and out through the conduit 12 in admixture with the effluent products of combustion. The liberated hydrogen appears to react with excess oxygen, thereby reducing carbon losses through side reactions. The make gas, as previously noted, appears to be confined primarily between the outer and inner spirals of the blast flame gases, finally becoming thoroughly mixed with the flame gases of the inner spiral. Further, by this method there is a greater equalization of temperatures along the flow of the blast flame gases through the furnace chamber, heat being transmitted from the hot flame gases of the outer spiral to the reacting gases of the inner spiral, which is promoted by their countercurrent flow relationship.

In operating in accordance with the first alternative procedure as described above, instead of introducing the make gas through conduit 14, it is introduced through make gas injection tube 16 positioned along the inner side of the blast burner 4, as more clearly shown in Figure 2 of the drawing. The make gas injection tube 16 may extend through the burner block 5, or may pass through the furnace wall along the inner side of the burner block. Instead of a single tube, a plurality of make gas injection tubes 16 may be used positioned at different distances from the end of the furnaces, advantageously being positioned parallel to each other and lying in the same vertical plane. The make gas injection tube or tubes 16, advantageously project somewhat into the furnace chamber so as to carry the make gas at least part way through the blanket of blast flame gases to avoid contact between the incoming make gas and the furnace walls.

When using the further alternative method of injecting the make gas into the furnace chamber, the make gas, advantageously in the form of a fine spray of atomized liquid is injected from make gas injection tube 17, which enters the furnace chamber 13 in a radial direction and projects into the furnace chamber a substantial distance so that the hydrocarbon is injected into the furnace atmosphere at the boundary of the upwardly rising outer spiral of blast flame gases and the inner descending spiral of gases.

The invention has been particularly described and illustrated with reference to a vertically positioned furnace having the outlet at the lower end thereof. The furnace described is capable of operating in the reverse vertical position and also in the horizontal position and may, with advantage, be operated in any intermediate position.

The proportions of fuel gas and combustion air are subject to considerable variation. Advantageously, the proportion of air is just sufficient to effect substantially complete combustion of the fuel gas. Under some conditions, an oxidizing blast flame is more desirable and, under other conditions, it may be found desirable to use a reducing flame.

The proportion of make gas to fuel gas may also be varied somewhat. However, it is essential that the total amount of gas be substantially in excess of that required for the complete consumption of the oxygen of the combustion air.

The relative velocities of the gas currents through the furnace should be such as to effect a rising outer spiral and a descending inner spiral, in accordance with the principle of cyclone separator operation. The velocities, however, should not be sufficient to throw the carbon particles out of suspension. The relative velocities will, of course, be dependent primarily upon the relative dimensions of the furnace chamber and the diameter of the outlet conduit.

In general, the inside diameter of the outlet conduit should fall within the range of 0.3 to 0.7 times the inner diameter of the cylindrical chamber, the height of the cylindrical body portion should be from 1 to 2 times its diameter and the height of the conical portion of the chamber should, likewise, be from 1 to 2 times the diameter of the cylindrical body portion.

In place of the blast burner shown, the apparatus may be provided with a tunnel inlet of a width about ¼ and a depth about ½ the inner diameter of the cylindrical chamber and hot combustion gases, generated without the chamber, passed to the chamber through the tunnel at a temperature sufficiently high to decompose the make gas to form carbon black. It is usually desirable, however, to employ a blast burner and generate the flame gases within the cylindrical chamber, as specifically illustrated.

The rate of mixing the incoming make gas with the hot flame gases may be varied by adjusting the position of the make gas injection tube 14. Where this tube is projected further into the furnace chamber, a more rapid mixing is obtained and further a greater extent of pyrolysis of the make gas in the injection tube before mixing with the blast flame gases also results. Where tubes 16 and 17 are provided it is likewise desirable that the distance they project into the furnace chamber be adjustable as the boundary between the outer and inner spirals may vary somewhat depending upon load and other operating conditions.

In operation, the outlet conduit 12 will be heated to an incandescent temperature and should be constructed of high heat refractory material, capable of withstanding such temperatures. In passing through the incandescent outlet conduit, the effluent gases are further heated by radiant heat from the conduit walls which tends to produce a carbon black of lower volatile content. From outlet conduit 12, the effluent gases with carbon black in suspension are passed to conventional cooling and separating apparatus for recovery of the carbon black.

Optimum velocities of the gases through the respective portions of the chamber will depend upon the particular product desired and the type of make gas employed and may readily be determined by simple tests, in the light of the foregoing disclosure.

The make gas may be a light hydrocarbon, such as natural gas, consisting essentially of methane, or may be a light hydrocarbon, such as natural gas, enriched by mixing therewith normally gaseous or liquid hydrocarbon of higher molecular weight. Where desired, the make gas, either enriched or unenriched, may be diluted by the addition of steam. Also, the "make gas" may, as previously noted, consist of a normally liquid hydrocarbon which is sprayed or atomized into the furnace chamber.

I claim:

A process for the production of furnace carbon by the decomposition of hydrocarbons comprising blasting a combustible mixture of a fuel gas and air tangentially into the lower end of a furnace chamber consisting of a cylindrical lower portion and a conical upper portion, the apex of said cone being at the upper end of the furnace chamber, igniting the combustible mixture as it enters the furnace chamber, and withdrawing gaseous reaction products through an outlet axially positioned in the lower end of the furnace chamber above the combustible mixture inlet thereto, thereby forming a high velocity stream of hot blast flame gases spiralling upwardly through the chamber along the confining walls thereof to the far end of the cone and then returning through the chamber as an inner spiral, and injecting the hydrocarbons to be decomposed into the furnace chamber near the apex of the cone-shaped portion thereof and along the coaxial line of the furnace chamber.

GEORGE L. HELLER.

References Cited in the file of this patent

UNITED STATES PATENTS

| Number | Name | Date |
|---|---|---|
| 1,618,808 | Burg | Feb. 22, 1927 |
| 1,738,620 | Umpleby | Dec. 10, 1929 |
| 2,010,634 | Hillhouse | Aug. 6, 1935 |
| 2,375,795 | Krejci | May 15, 1945 |
| 2,388,348 | Stimson | Nov. 6, 1945 |
| 2,440,424 | Wiegand et al. | Apr. 27, 1948 |
| 2,499,438 | Wiegand et al. | Mar. 7, 1950 |